Figure 2:
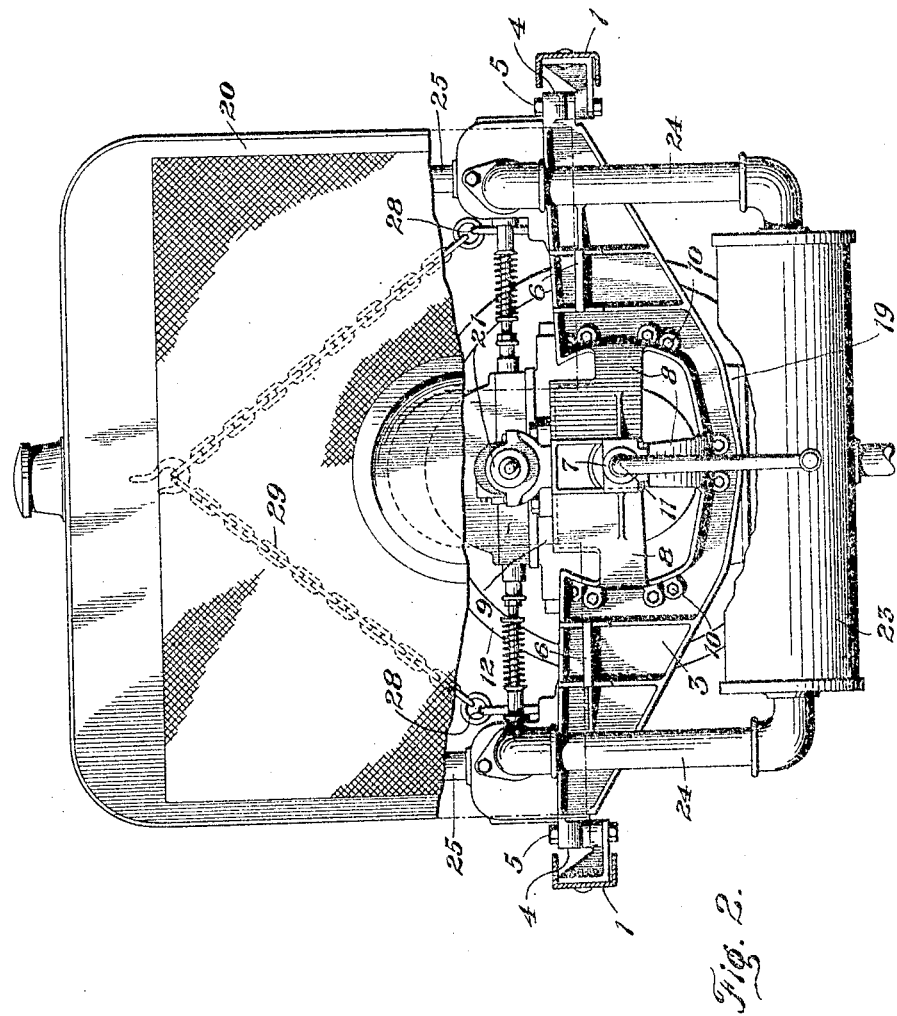

E. S. SANDGREN & C. F. CASE.
MOTOR VEHICLE.
APPLICATION FILED SEPT. 30, 1910.
1,020,518.
Patented Mar. 19, 1912.
2 SHEETS—SHEET 1.
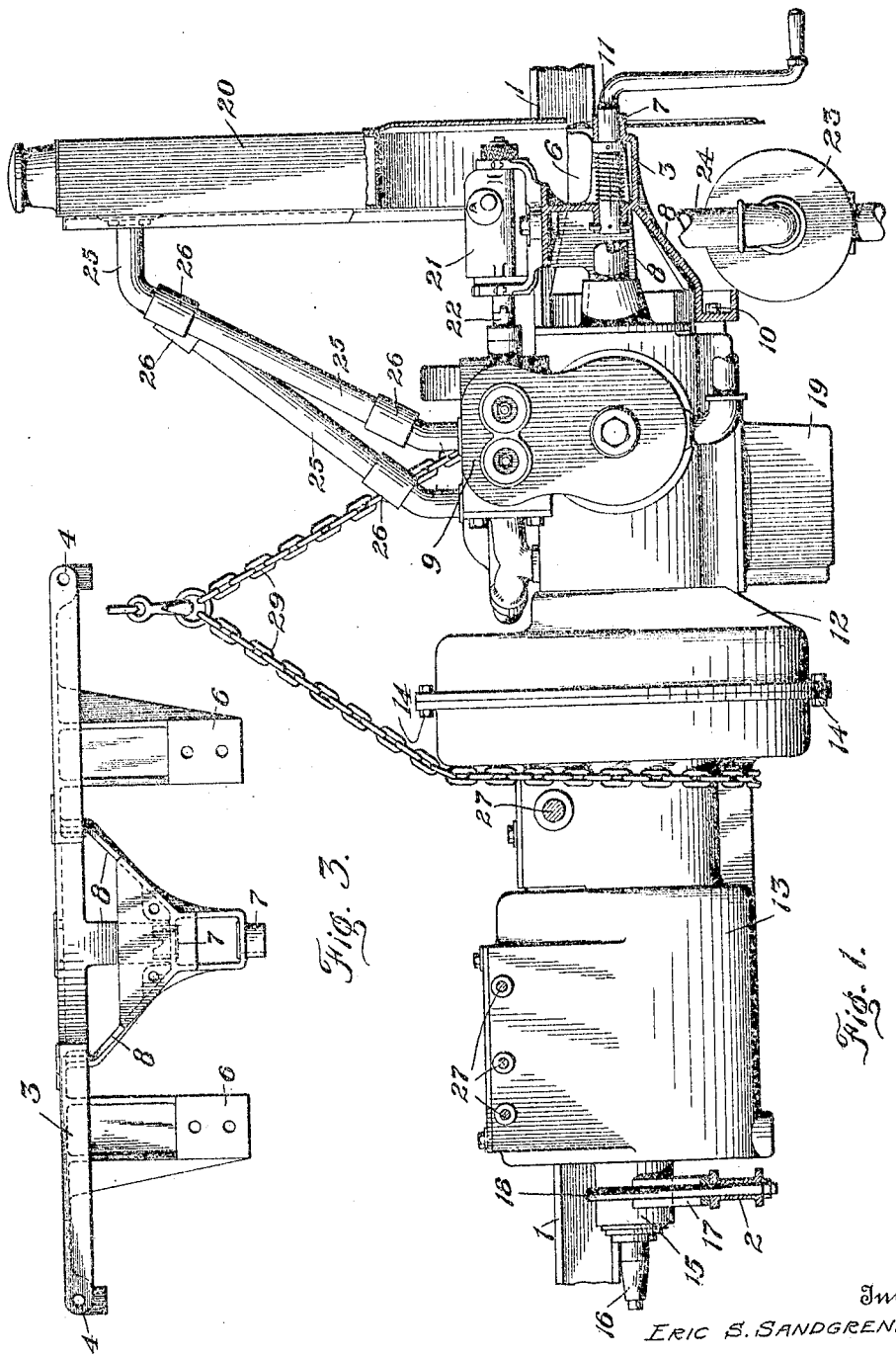
Inventors
ERIC S. SANDGREN.
CHARLES F. CASE.
Witnesses
Chas. W. Stauffiger.
A. M. Dorr.
By 
Attorneys

// BEST AVAILABLE COPY

UNITED STATES PATENT OFFICE.

ERIC S. SANDGREN AND CHARLES F. CASE, OF DETROIT, MICHIGAN, ASSIGNORS TO OLIVER MOTOR CAR COMPANY, OF DETROIT, MICHIGAN, A CORPORATION OF MICHIGAN.

MOTOR-VEHICLE.

1,020,518.  Specification of Letters Patent.  Patented Mar. 19, 1912.

Application filed September 30, 1910. Serial No. 584,673.

*To all whom it may concern:*

Be it known that we, ERIC S. SANDGREN, a subject of the King of Sweden, and CHARLES F. CASE, a citizen of the United States of America, residing at Detroit, in the county of Wayne and State of Michigan, have invented certain new and useful Improvements in Motor-Vehicles, of which the following is a specification, reference being had therein to the accompanying drawings.

In the construction of automobile trucks and vehicles for commercial uses it is desirable that the power plants be so situated as to be easily removed for repair or be interchanged with others where greater or less horse power is desired for different purposes.

This invention relates to automobiles and more especially to an arrangement of the power plants thereof whereby they may be readily removed when the vehicles have been repaired or be interchanged for other plants.

The invention consists in the matters hereinafter set forth, and more particularly pointed out in the appended claims.

In the drawings, Figure 1 is a view in side elevation of a portion of the chassis of an automobile with a power plant thereon that embodies features of the invention; Fig. 2 is a view in front elevation thereof; Fig. 3 is a view in detail of the forward cross member.

As herein indicated, the side members 1 of a chassis of usual type are secured at an interval from their forward ends by a cross bar 2. A cross member 3, preferably forged or cast in a single piece has its ends 4 secured as by bolts 5 between the flanges of the channel comprising the side members of the chassis. A pair of forwardly extending brackets 6, suitably ribbed and flanged for strength and lightness are formed on the outer face of the cross member and a bearing 7 is centrally disposed thereon between the brackets in advance of an opening in the body of the cross member, by arms 8 spanning the opening and integrally formed on the member.

A motor 9 that is herein illustrated as of the double opposed type but which may be of any preferred form having a main shaft arranged longitudinally of the chassis has a forward portion of its crank case secured against the rear face of the forward cross members by bolts 10 or the like with a starting shaft 11 in alinement with the central bearing 7 of the member in which it is journaled. A rearwardly projecting portion 12 of the casing that is preferably formed integrally thereon is faced or otherwise fitted to receive the end of a transmission mechanism case 13 that is secured thereto by bolts 14 or the like passing through abutting flanges or lugs on the meeting parts. A circular boss 15 on the end of the transmission shaft casing is apertured to receive the bearing of a transmission shaft 16 extending therethrough and is itself supported in a suitable block 17 by a clip or U-bolt 18 embracing the boss and passing through the cross bar 2 of the chassis on which the block is placed.

A lubricator of any preferred form suitable for the work to be done is mounted on the motor. As herein indicated the casing 19 of the lubricator is bolted or otherwise properly secured to the underside of the motor casing.

A radiator 20 is supported on the forwardly extending brackets of the cross member and bridges the starting shaft and bearing therefor. The central portion adjacent the bearing is cut away and in the opening thus formed a magneto 21 is placed on the cross member and coupled directly to the motor through a suitable coupling 22 or other preferred form of driving connection. A muffler 23 is suspended below the radiator by pipes 24 leading from the exhaust openings of the cylinders. Water connection with the radiator is made through suitable fittings 25 on the cylinder and radiator, coupled by hose 26 in the usual manner. Rock shafts 27 that project beyond the transmission casing may be detachably coupled with any preferred form of control levers on the truck body to give the usual motor control. Eye-bolts 28 may be added for conveniently applying a chain bridle 29 for lifting the plant from the chassis.

By this method of construction a complete power plant is obtained that forms a bodily removable unit supported on three points on the forward portion of the chassis in such manner that it can be readily removed by taking out the retaining bolts at these places and applying the bridle or like part as indicated. As the radiator is the only portion of the mechanism that extends above the chassis the operator's platform can be removably secured over the plant thus leaving the remainder of the chassis for the body of the truck. There are no essential portions of the plant which are not an integral part thereon so that the entire mechanism for propelling the vehicle is bodily removable with little trouble.

Obviously, changes in the details of construction may be made without departing from the spirit of the invention and we do not care to limit ourselves to any particular form or arrangement of parts.

We claim as our invention:

1. The combination of a chassis having a pair of side members permanently connected at an interval from their forward ends by a cross bar, with a cross member adapted to be detachably secured to the forward ends of the chassis side members and having a central bearing, a motor secured to the rear side of the cross members, a starting shaft for the motor extending through said bearing in the cross member, a transmission casing secured to the motor with its free end detachably and rotatably mounted on the cross bar, a radiator for the motor supported on the member and an electric generator for the ignition system of the motor on the cross member.

2. The combination of a chassis having a pair of side members permanently connected at an interval from their forward ends by a cross bar, of a cross member adapted to be secured detachably to the forward ends of the chassis side members, a bearing on the cross member, a motor secured to the rear side of the cross member, a starting shaft for the motor journaled in the cross member bearing, a transmission casing secured to the rear side of the motor with its free end detachably and rotatably secured on the cross bar, a radiator resting on the cross member, an electric generator for the ignition system of the motor mounted on the cross member, and a muffler for the motor suspended from the motor.

3. The combination of a chassis having a pair of side members permanently secured at an interval from their forward ends by a cross bar, with a cross member adapted to be detachably secured to the forward ends of the side members, a motor secured to the rear face of the said member and provided with a transmission casing whose free end is detachably supported on the cross bar, a starting shaft for the motor rotatably mounted on the cross member, a radiator supported on the cross member and provided with a lower central opening, a generator for the motor ignition system secured on the cross member within the radiator opening, and a muffler below the cross member secured to the motor.

4. The combination of a chassis having a pair of side members permanently connected at an interval from their forward ends by a cross bar, with a cross member adapted to be detachably secured at its extremities to the forward ends of the side members and provided with a central bearing, a motor secured to the rear face of the cross member and provided with a starting shaft journaled in said bearing, a rearwardly extending transmission casing secured to the motor, a cylindrical boss on the rear end of the casing, a saddle block on the cross bar of the chassis in which the transmission casing boss rests, a clip detachably securing the boss and saddle block on the cross bar, a radiator on the cross member, an electric generator for the motor ignition system on the cross member, and a muffler suspended from the motor.

5. The combination of a chassis having a pair of side members permanently connected at an interval from their forward ends by a cross bar, with a cross member whose ends are adapted to be detachably secured to the forward ends of the chassis side members and provided with a central opening, a bearing formed integrally on the cross member in advance of the opening by arms spanning the opening, a pair of forwardly extending brackets on the member, a radiator secured on the brackets, a motor secured against the rear side of the member with its starting shaft journaled in the bearing of the member, a radiator supported on the brackets and provided with an opening over the central portion of the member, an electric generator for the ignition system of the motor mounted on the member within the radiator opening, a transmission casing secured to the rear end of the motor, a cylindrical boss on the rear end of the casing, a saddle block on the cross bar of the chassis on which the boss rests, a U-clip securing the boss on the block and the block on the bar, and a muffler beneath the cross member suspended from the motor.

6. The combination in an automobile power plant, of a cross member adapted to be detachably secured to a chassis frame at the forward end as a component member thereof and provided with radiator brackets and with a motor starting shaft bearing, a starting shaft journaled in said bearing, a motor secured to the rear side of the cross member, a transmission casing secured rigidly to the rear end of the motor and adapted at its rear end to be pivotally supported on an automobile chassis, a radiator on the brackets having an opening over the bearing, an electric generator for the ignition system of the motor mounted on the member within the radiator opening and a muffler suspended from the motor.

7. The combination in an automobile power plant, of a cross member adapted to be detachably secured to the forward end of the chassis frame as a component member thereof, radiator brackets on the member, a motor starting shaft on the member, a motor secured to the rear side of the cross member, a transmission casing secured rigidly to the rear end of the motor and provided at its rear end with a bearing boss adapted to be journaled on a member, a radiator supported on the brackets over the shaft bearing and provided with an opening above the bearing, an electric generator for the ignition system of the motor mounted on the member within the radiator opening, a muffler suspended from the motor, and water cooling connection pipes between the radiator and the motor.

In testimony whereof we affix our signatures in presence of two witnesses.

ERIC S. SANDGREN.
CHARLES F. CASE.

Witnesses:
 ANNA M. DORR,
 OTTO F. BARTHEL.